United States Patent [19]

Hamasaka et al.

[11] Patent Number: 5,184,341
[45] Date of Patent: Feb. 2, 1993

[54] INFORMATION RECORDING METHOD HAVING SUCCESSIVE DATA WRITE AND DATA VERIFY OPERATIONS

[75] Inventors: Hiroshi Hamasaka, Nishinomiya; Isao Satoh, Neyagawa; Yoshihisa Fukushima, Osaka, all of Japan

[73] Assignee: Matsushita Electric Industrial Co., Ltd., Osaka, Japan

[21] Appl. No.: 486,099

[22] Filed: Feb. 28, 1990

[30] Foreign Application Priority Data

Mar. 3, 1989 [JP] Japan .................................. 1-52287
Mar. 23, 1989 [JP] Japan .................................. 1-70866

[51] Int. Cl.⁵ .............................................. G11B 7/00
[52] U.S. Cl. ......................................... 369/54; 360/53
[58] Field of Search ............... 360/48, 53, 31; 369/54, 369/58, 59

[56] References Cited

U.S. PATENT DOCUMENTS

4,809,091  2/1989  Miyazawa et al. ................... 360/48
4,814,903  3/1989  Kulakowski et al. ................. 360/48
4,924,330  5/1990  Seamons et al. ...................... 360/66

*Primary Examiner*—Robert L. Richardson
*Attorney, Agent, or Firm*—Wenderoth, Lind & Ponack

[57] ABSTRACT

In an information recording method in repeatedly and alternately performing a write operation and a verifying operation on an information recording medium having a spiral track, the data processing sector unit amount is set in advance to be less by the latency necessary for the inter-track jump. Also, the processing data for the data recording operation and the verifying operation are set to an appropriate length, so that a desired processing time is obtained from the time after termination of the data reading out operation of the verifying operation to the time of commencement of the data recording operation in the write operation. It is thus possible to minimize the latency from the writing operation to the verifying operation and the latency from the verifying operation to the next writing operation.

5 Claims, 8 Drawing Sheets

INFORMATION RECORDING METHOD HAVING SUCCESSIVE DATA WRITE AND DATA VERIFY OPERATIONS

BACKGROUND OF THE INVENTION

1. Field of the Invention

The present invention relates to an information recording method for recording information by alternately and repeatedly carrying out a data recording operation and a verifying operation in the control of an information recording and reproducing apparatus employing a disk shaped information recording medium having a spiral track.

2. Description of the Prior Art

In an optical disk, normally an optically detectable guide track such as guide groove is provided to render the track density high. On the recording layer on the guide track a laser light concentrated to about 1 μm is irradiated to induce an optically detectable change such as boring or phase change to record information. The recording pitch or track pitch is very small, about 1 μm, so that, depending on the manufacturing process or the operation environment of the optical disk, various kinds of defects, dust, flaws, etc. are formed giving rise to dropout of the reproduced signal. Accordingly, the error rate before error correction of the optical disk is about $10^{-4}$ to $10^{-6}$, which is extremely large in comparison with that of the magnetic disk being $10^{-9}$ to $10^{-12}$, and a number of defective sectors are generated on the optical disk.

Accordingly, in an optical disk unit, in order to assure reliability of data, a verifying operation is required to be performed after the data recording operation. In the verifying operation, an error detection is performed against the data read out in a sector unit. When an uncorrectable error has been detected, defect management is necessitated. If a data necessary for defect management recording is stored in an optical disk unit, the optical disk unit is allowed to perform defect management efficiently.

Practically, however, the memory capacity contained by an optical disk unit is limited, and sometimes all the data cannot be stored. In such a case, the data to be recorded is divided into plural sections, and the recording operation and the verifying operation on the divided data re carried out alternately and repeatedly.

Hereinafter, the data recording operation and the verifying operation to be carried out alternately and repeatedly in the conventional optical disk unit is explained with reference to the drawings.

Figure 5:
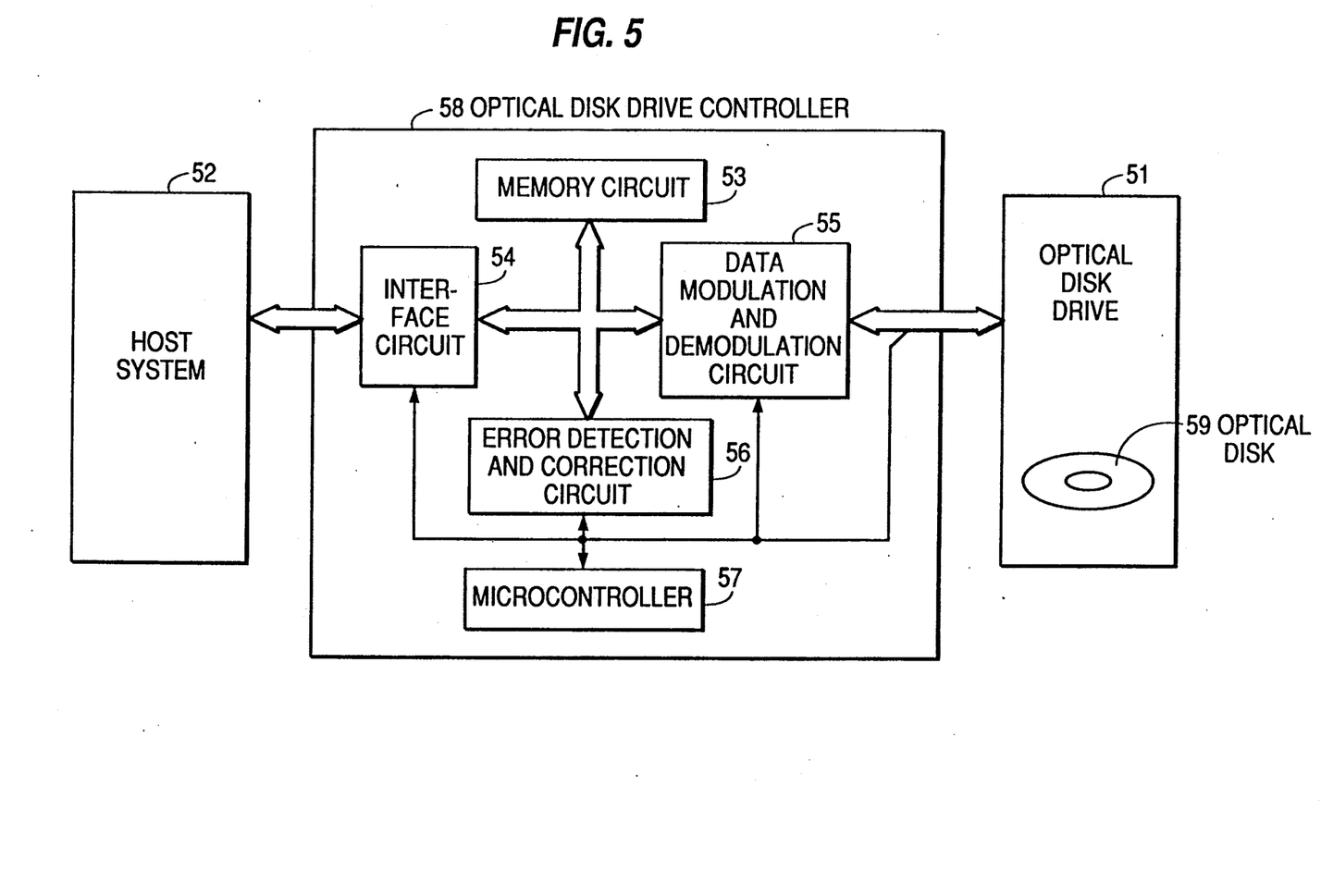
FIG. 5 is a block diagram of an optical disk unit.

FIG. 5 is a block diagram showing an ordinary optical disk unit. Between an optical disk drive 51 and a host system 52 there is disposed an optical disk drive controller 58. An optical disk 59 having a spiral track is housed in the optical disk drive 51. The optical disk drive controller 58 is constructed by a memory circuit 53, an interface circuit 54, a data modulation and demodulation circuit 55, an error detection and correction circuit 56, and a microcontroller 57. In the memory circuit 53, the control data necessitated by the microcontroller 57 and the recording and reproducing data are stored. The interface circuit 54 controls the data transfer between the hose system 52 and the optical disk drive controller 58. The data modulation and demodulation circuit 55 performs modulation and demodulation of data. The error detection and correction circuit 56 performs encoding and decoding of the error correction code. The microcontroller 57 controls the interface circuit 54, the data modulation and demodulation circuit 55, and the error detection and correction circuit 56.

Figure 6:
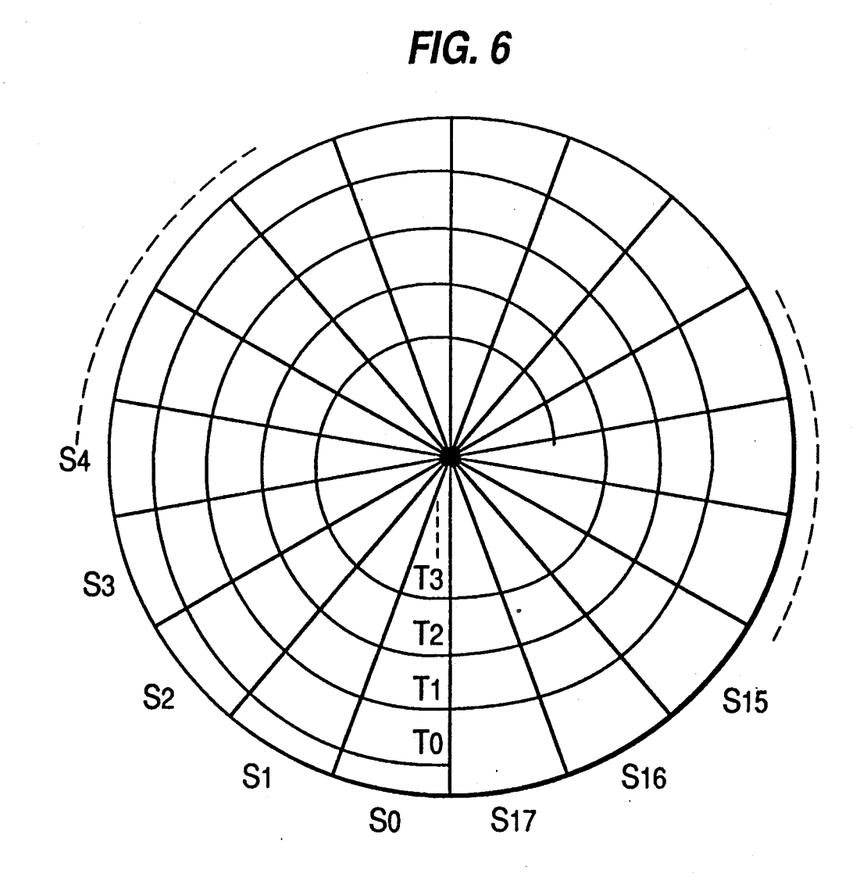
FIG. 6 is a format chart on a optical disk.

FIG. 6 shows a format diagram of the optical disk 59, in which a continuous spiral track starting from track $T_0$ is equally divided into 18 sectors from $S_0$ to $S_{17}$.

Figure 7:
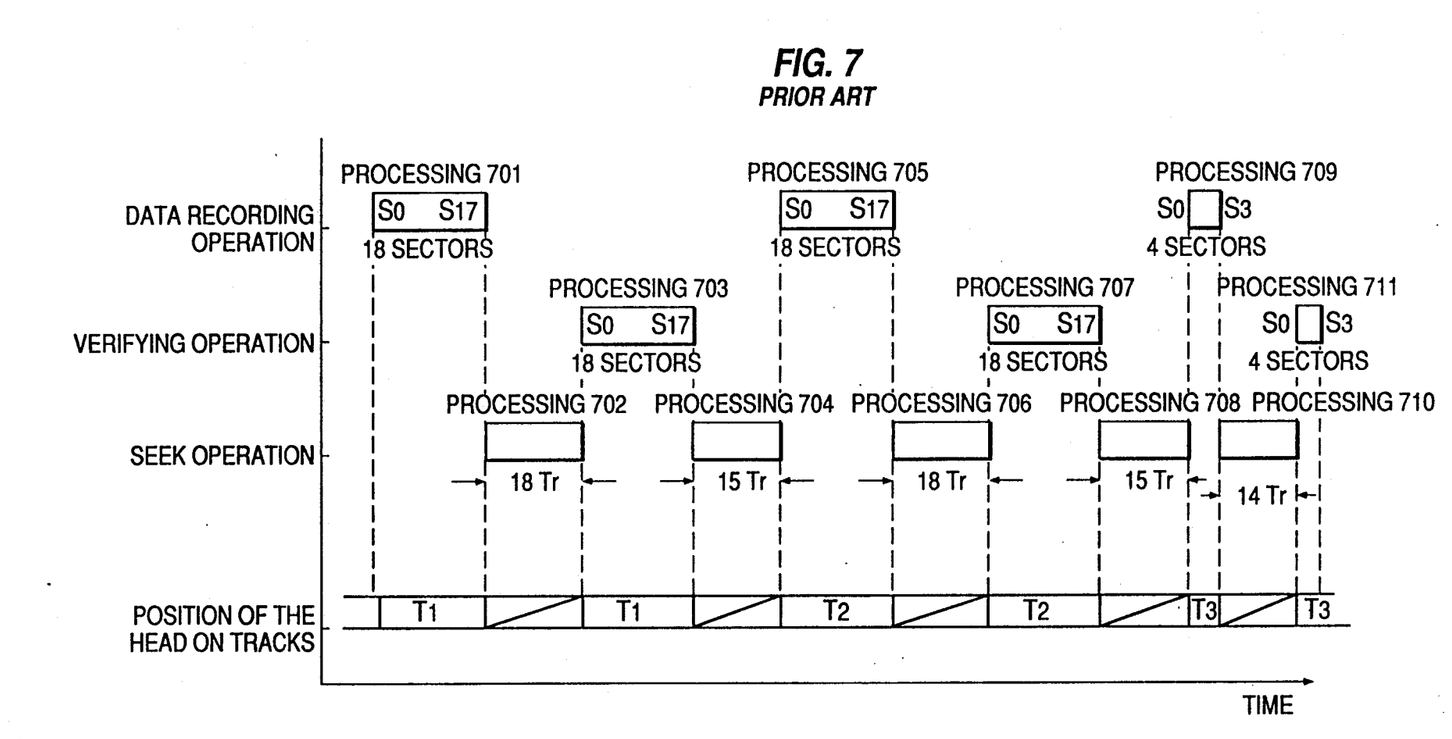
FIG. 7 is an illustrative view of an operation of the conventional optical disk unit.

FIG. 7 is a view to illustrate the operation in the conventional optical disk unit, showing the state where the data recording operation and the verifying operation are repeatedly carried out. In FIG. 7, a latency corresponding to 1 sector is represented by $\tau_T$. The term "latency" denotes a rotational delay of a disk drive, i.e., the time needed for data to rotate under the recording and reproducing head once the head is in position over the appropriate track.

Hereinafter, the 40-sector data writing operation for alternately and repeatedly performing the data recording operation and the verifying operation in the processing unit of the 1 track data mount is explained with reference to FIG. 7. Here, it is assumed that, of the seek operation to the starting sector for performing a verifying operation after the data recording operation, the time required for the inter-track jump operation corresponds to the 4-sector latency. Also, it is assumed that a latency corresponding to 3 sectors in total is required for performing the post-process of the verifying operation and the pre-processes for the next data recording operation.

First, the processing 701 or the data recording operation for 18 sectors from sector $S_0$ of track $T_1$ to sector $S_{17}$ of track $T_1$ is carried out. Then, in the processing 702, a seek operation of the data to be verified to the heat track $T_1$ sector $S_0$ is carried out. For the purpose of this seek operation, a latency corresponding to at least 4 sectors for the inter-track jump operation is required, and for the seek operation in the processing 702, a latency corresponding to 1 track is required.

Next, in the processing 703, the verifying operation for 18 sectors from the sector $S_0$ of the track $T_1$ to the sector $S_{17}$ of the track $T_1$ are carried out. The subsequent second time data recording operation is performed from the track $T_2$ sector $S_0$. However, as a latency corresponding to 3 sectors in total is required to perform the post-process of the verifying operation and the pre-processes for the next data recording operation, in the processing 704, a latency of 15 sectors is performed for the seek operation to the track $T_2$ sector $S_0$.

Thereafter, the processing 705 for an 18 sector data recording operation, the processing 706 or latency for the seek operation, the processing 707 for the 18 sector data verifying operation, and again the processing 708 or latency for the seek operation, the processing 709 for the 4 sector data recording operation, the processing 710 or latency for the seek operation, and finally processing 711 for a 4 sector data verifying operation are similarly repeated to complete the 40 sector data recording operation.

Figure 8:
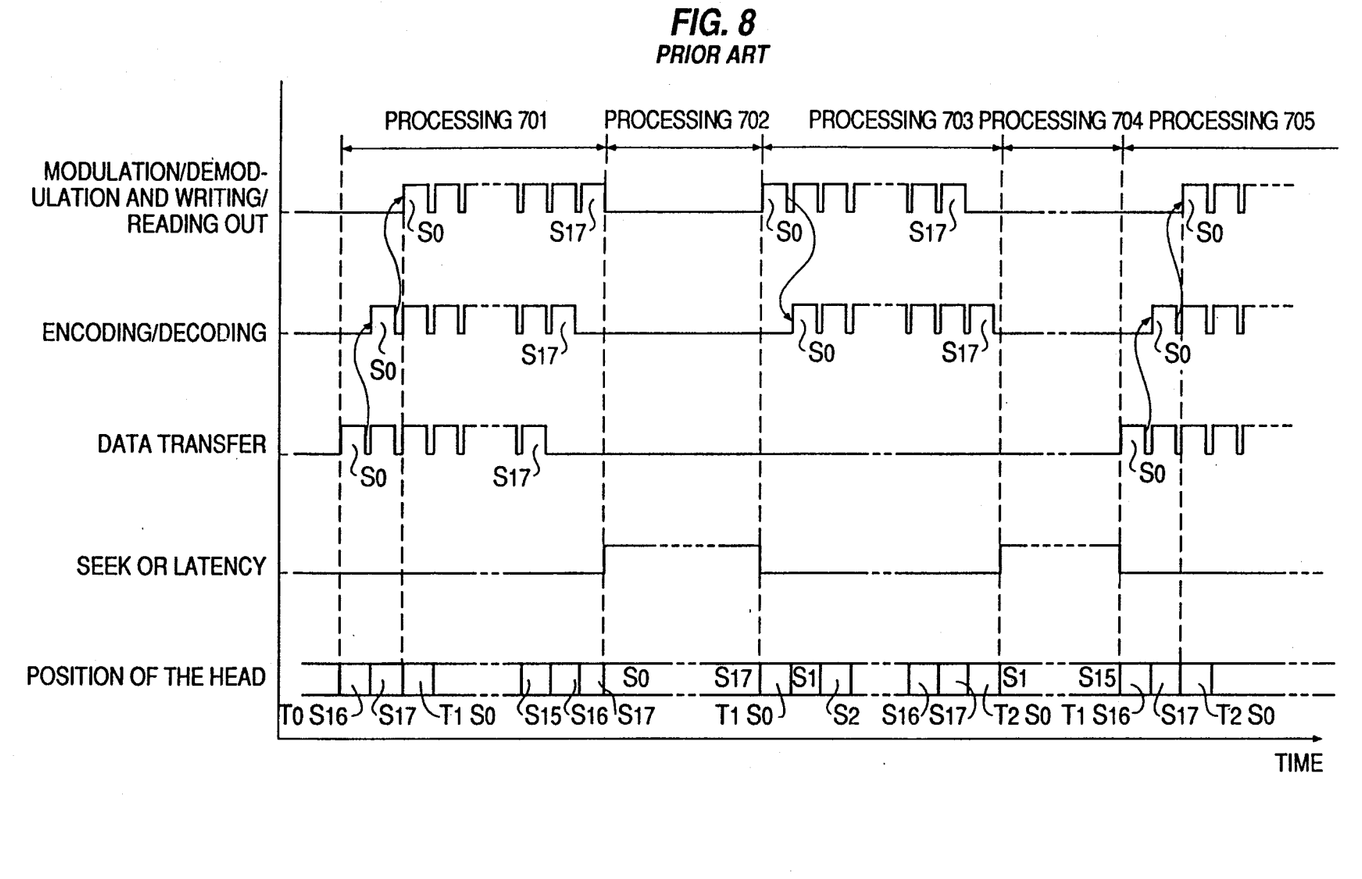
FIG. 8 is a time chart for illustrating the operation of the conventional optical disk unit.

FIG. 8 is a time chart for illustrating the detailed processing in the conventional optical disk unit. Using FIG. 8, the operation from the processing 701 to the processing 704 is described in more detail.

The processing 701 for an 18 sector data recording operation is carried out as follows: The data transferred sector by sector from the host system 52 are passed through the interface circuit 54 and stored in the memory circuit 53. Further, the error detection and correction circuit 56 adds an error correction code to the data in the memory circuit 53 in the encoding operation in the unit of 1 sector. Further, the encoded data is modulated in the data modulation and demodulation circuit 55 and sent to the optical disk drive 51, and written in the sector $S_0$ of the track $T_1$ on the optical disk 59. The data modulation and writing operations, the encoding operation in the next sector, and further the transfer of the data from the host system 52 in the next sector are performed in parallel with one another repeatedly. Further, at the time when the writing of the data of 18 sectors up to the sector $S_{17}$ of the track $T_1$ has been completed, the processing 701 or the data recording operation for the first 1 track is terminated.

Next, the processing 702 for a seek operation is carried out. The optical disk drive controller 58 sends a seek operation command to the optical disk drive 51 so as to perform the processing 703 or verifying operation from the sector $S_0$ of the track $T_1$, since the track structure of the optical disk 59 is spiral. In the optical disk drive 51, the processing 702 or seek operation of the sector $S_0$ to the track $T_1$ is performed. However, at the time when the jump operation between the tracks for the seek operation has completed, the unillustrated recording and reproducing head of the optical disk drive 51 is not ready on the sector $S_0$. For this reason, for the seek operation of the sector $S_0$ to the track $T_1$ in the processing 702, a latency corresponding to one cycle rotation of the optical disk 59 is required.

Then, the processing 703 or verifying operation of the data of 18 sectors is performed. On completion of the seek operation of the processing 702, the data modulation and demodulation circuit 55 demodulates the data read out in the unit of 1 sector from the sector $S_0$ of the track $T_1$. Further, the error detection and correction circuit 56 checks for the existence of an uncorrectable error while decoding the demodulated data. The data decoding operation and the demodulation operation to the next sector are concurrently performed. If no error is detected, a verifying operation for the 18 sectors up to the sector $S_{17}$ of the track $T_1$ is performed. If an error is detected during the verifying operation, the processing 703 is discontinued, and a processing to substitute the sector in which the error has been detected for other sector is performed.

Thereafter, the processing 704 or a latency for the seek operation is performed. The post-process in the verifying operation of processing 703, or the decoding operation of the sector $S_{17}$ of the track $T_1$, is completed when the head is located on the sector $S_0$ of the track $T_2$. However, in order to perform a data recording operation from the sector $S_0$ of the track $T_2$, when the head is located on the sector $S_{16}$ of the track $T_1$, data transfer of the sector $S_0$ of the track $T_2$ must be performed as pre-processes of the data recording operation. Accordingly, for recording the data from the sector $S_0$ of the track $T_0$ in the processing 705, a latency corresponding to 15 sectors is required for the seek operation of the processing 704.

However, in the abovementioned conventional embodiment, because of the seek operation necessitated for performing a verifying operation after the data recording operation, there arises a latency corresponding to one cycle rotation of a disk with the addition of a latency to the time required for the inter-track jump operation. Also, in the conventional embodiment as described above, because of the necessity to perform a post-process of the verifying operation and pre-processes of the data recording operation, it is not possible to perform the data recording operation from the recording sector immediately following the termination of the verifying operation, so that there arises a latency corresponding to 15 sectors during the time from the verifying operation to the succeeding data recording operation.

As described above, there arises a latency between the data recording operation and the verifying operation, resulting in an elongation of the data processing time.

SUMMARY OF THE INVENTION

An object of the present invention is to minimize the latency for the seek operation which is necessary when repeatedly and alternately performing the data recording operation and the verifying operation on an information recording medium having a spiral track. Another object of the present invention is to minimize the latency necessitated before the commencement of the data recording operation following the verifying operation.

In order to attain the above objects, the information recording method of the present invention is characterized in that a data processing sector unit amount (i.e. the number of sectors to be recorded in one write operation and verified in one verify operation) in the data recording operation and verifying operation is defined by the number of sectors obtained by subtracting the number of sectors to be recorded in the processing time for the inter-track jump operation necessitated to perform the next verifying operation after the data recording operation from the, the number, or a multiple number, of sectors of the track.

Further, the information recording method of the present invention is characterized in that the data processing unit in the first data recording operation is the number of sectors obtained by subtracting the number of sectors to be recorded in the write-verify overhead time required to perform the operation necessary for transition from the data recording operation to the verifying operation from the number of sectors of the track, and the data processing unit in the verifying operation and the data recording operation in the second operation and thenceforth is the number of sectors obtained by subtracting the number of sectors to be recorded in the processing time for the post-process of the verifying operation and the pre-processes of the data recording operation necessitated during the time from the data writing operation in the verifying operation to the data reading out operation in the next data recording operation from the number of sectors on which the data recording was performed for the first time.

In the present invention, by the method as described above, it is possible to minimize the time of the seek operation necessitated for performing the verifying operation after the data recording operation by setting the processing data lengths for the data recording operation and verifying operation so that a processing time for the inter-track jump operation necessary for transition from the data recording operation to the next verifying operation is formed in performing a data recording operation and a verifying operation alternately and in repetition.

Also, in the present invention, it is possible to minimize a latency necessitated by the commencement of the next data recording operation after the verifying operation by setting the processing data lengths for the data processing operation and verifying operation so that a processing time for the post-process of the verifying operation and the pre-processes of the data recording operation is formed during the time from the time after completion of the data reading out operation in the verifying operation to the time of commencement of the data writing operation in the data recording operation.

In the present invention, it becomes possible to minimize the latency between the two operations of the data recording operation and the verifying operation by adequately setting the processing data for the data recording operation and verifying operation by performing the above information recording and reproducing method. In this manner it is possible to realize efficient data processing.

BRIEF DESCRIPTION OF THE DRAWINGS

FIGS. 4(a)-(d) depict a memory map of the second embodiment of the present invention;

DESCRIPTION OF THE PREFERRED EMBODIMENTS

Hereinafter, the first and second embodiments of the information recording method of the present invention will be explained. In this explanation, the block diagram of the optical disk unit of FIG. 5 as used in the explanation on the conventional embodiment and the format chart on the optical disk in FIG. 6 are employed. In FIG. 5, the block diagrams for the optical disk unit of the conventional embodiment and the information recording and reproducing apparatus of the present invention embodiment are identical, with only the content of the microcontroller 57 being different. In FIG. 6, the optical disk used in the conventional embodiment and the operation which is an information recording medium to be used in the embodiment of the present invention have the same format.

The information recording method, which is the first embodiment of the present invention, is explained with reference to the drawings. The first embodiment is an information recording method for minimizing the latency for the seek operation which is necessitated for performing the verifying operation after the data recording operation.

Figure 1:
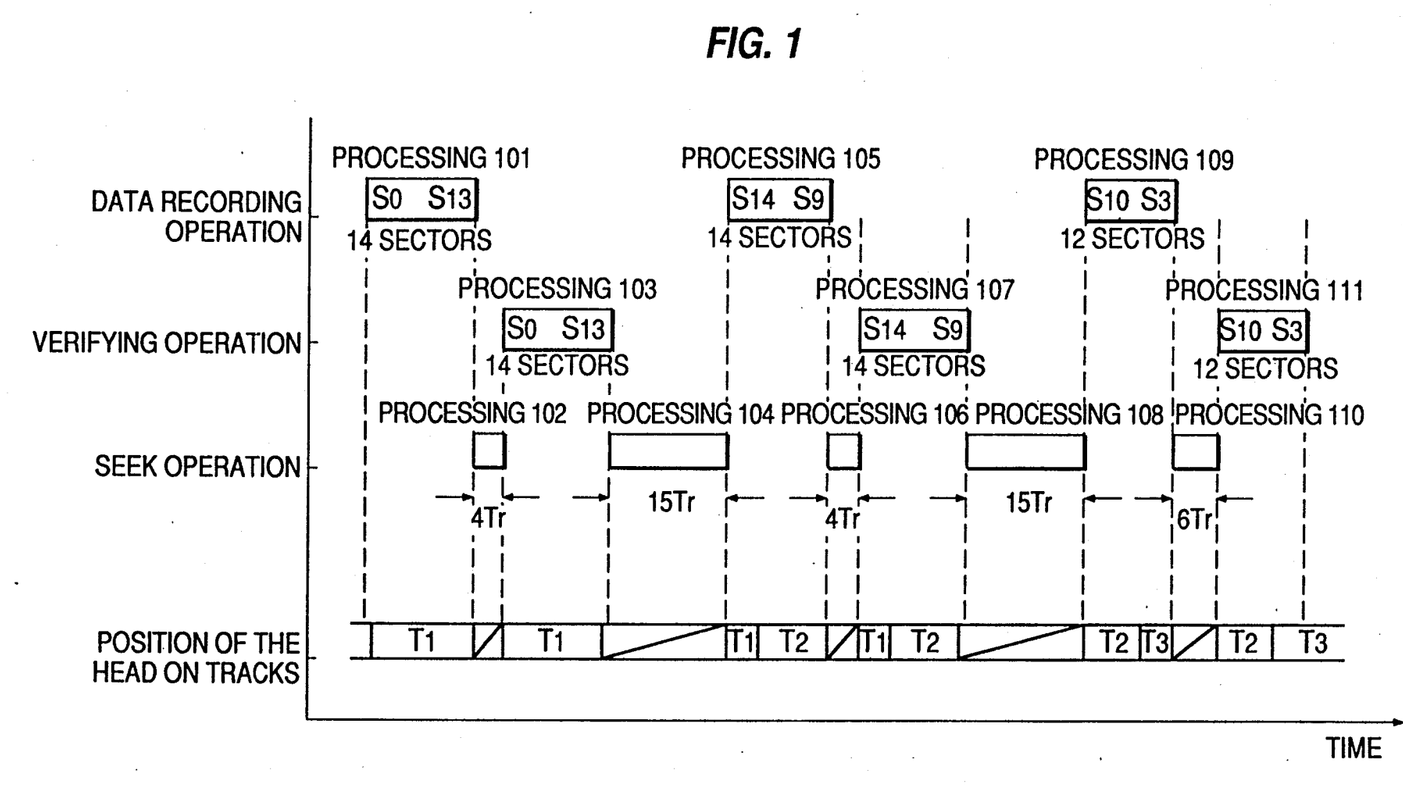
FIG. 1 is an illustrative view of an operation of the first embodiment of the present invention.

FIG. 1 is a view to illustrate the operation of the first embodiment of the information recording method of the present invention. FIG. 1 schematically shows the processing procedures for the optical disk drive controller 58 to record data on the optical disk 59 and the position of the recording and reproducing head on the optical disk 59. In FIG. 1, the latency corresponding to 1 sector is represented by $\tau_7$.

In this embodiment, a 40K byte data recording operation on an optical disk in which 1 track is composed of 18 sectors is explained herebelow. In this embodiment, as the sector length is 1K bytes, data recording of 40 sectors is performed.

The data processing amount in each successive data recording operation and verifying operation is obtained as follows: The time required for the intertrack jump operation (which is a jumping operation of two tracks) in the seek operation for searching the head sector for performing the verifying operation after the data recording operation is called a track jump time, which is deemed to correspond to the latency corresponding to 4 sectors. Further, the time required for the processing necessary for shifting from the data recording operation to the verifying operation is called the write-verify overhead time, and the track jump time is assumed to be equal to the write-verify overhead time.

Further, it is assumed that a memory having a capacity corresponding to 14 sectors is used for the verifying operation in the memory circuit 53.

The data processing amount in each associated data recording operation and verifying operation is 14 sectors which is obtained by subtracting 4 sectors corresponding to the track jump time from the sector capacity of 1 track. The succeeding verifying operation is commenced without latency in the range not exceeding 14 sectors corresponding to the capacity of the memory circuit 53.

The specific, concrete processing procedures are explained according to FIG. 1. Here, it is assumed that before the start of the initial data recording operation the information recording and reproducing head is already positioned at the top of the sector in which the data are to be written, and the data recording and verifying are to be carried out from the sector $S_0$ of the track $T_1$.

First, the data recording operation for 14 sectors from the sectors $S_0$ of the track $T_1$ to the sector $S_{13}$ of the track $T_1$, i.e., the processing 101, is performed. Then, the seek operation to the head of the data to be verified, i.e., the processing 102 is performed. In the processing 102, the inter-track jump operation is completed within the track jump time which corresponds to the recording of the latency corresponding to 4 sectors. Immediately thereafter, the not illustrated recording and reproducing head is at the top of the sector $S_0$ of the track $T_1$, by which the seek operation of the processing 102 is completed.

Next, in the processing 103, the verifying operation for 14 sectors from the sector $S_0$ of the track $T_1$ to the sector $S_{13}$ of the track $T_1$ is performed. As it is not possible to carry out a data recording operation from the time immediately after the verifying operation, after the latency corresponding to 15 sectors for the seek operation, i.e., the processing 104, the second data recording operation is carried out for the data of 14 sectors from the sector $S_{14}$ of track $T_1$ in the processing 105.

Thereafter, the operations of processing 106 or the latency for the seek operation, processing 107 or the data verifying operation for 14 sectors, again processing 108 or the latency corresponding to 15 sectors, processing 109 or the data recording operation for 12 sectors, processing 110 or the latency for the seek operation, and finally processing 111 or the data verifying operation for 12 sectors are carried out in a similar manner to complete the data recording operation for 40 sectors.

As described above, according to this embodiment, in repeating alternately the data recording operation and the verifying operation, the seek operation to be necessitated for performing the verifying operation after the data recording operation can be carried out with a minimum latency.

To describe in general the data processing amount in each associated data recording operation and verifying operation which is a point of this system, when the data processing amount is set to be the value lying within the memory capacity and obtained by subtracting the number of the sectors corresponding to the track jump time between the tracks from the total number of the sectors of the tracks, the latency for the seek operation can be minimized.

The information recording method according to the second embodiment of the present invention is hereinafter explained with reference to the drawings. In the second embodiment, the data recording operation and verifying operation which are repeatedly and alternately performed are more efficiently carried out by minimizing the latency in the first embodiment necessary during the time from the verifying operation to the shift to the next data recording operation.

Figure 2:
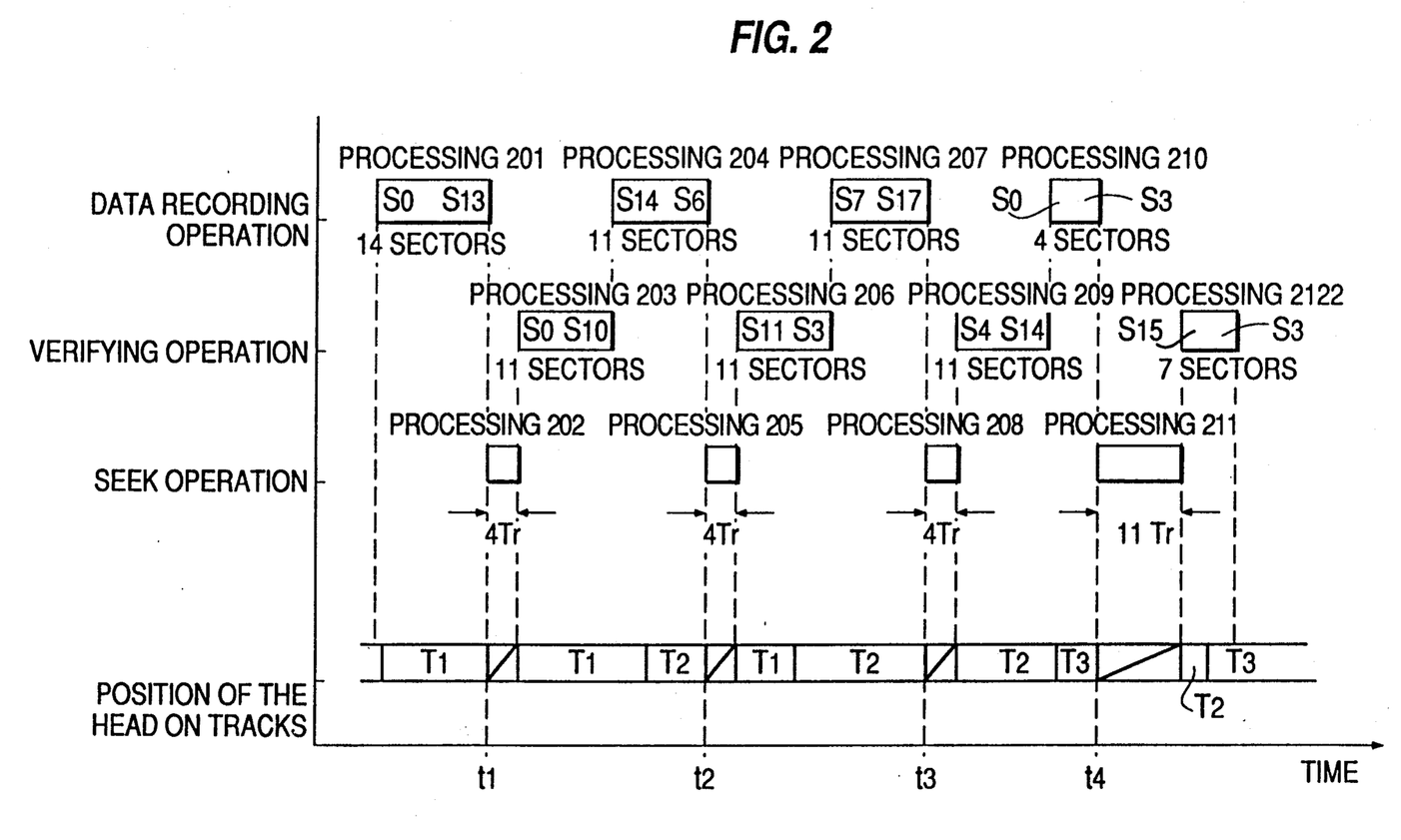
FIG. 2 is an illustrative view of an operation of the second embodiment of the present invention.

FIG. 2 is a view to illustrate the operation of the second embodiment of the information recording method of the present invention. FIG. 2 schematically shows the processing procedures for the optical disk drive controller 58 to record data on the optical disk 59 and the position of the recording and reproducing head on the optical disk 59. In FIG. 2, the latency corresponding to 1 sector is represented by $\tau_T$.

Figure 3:
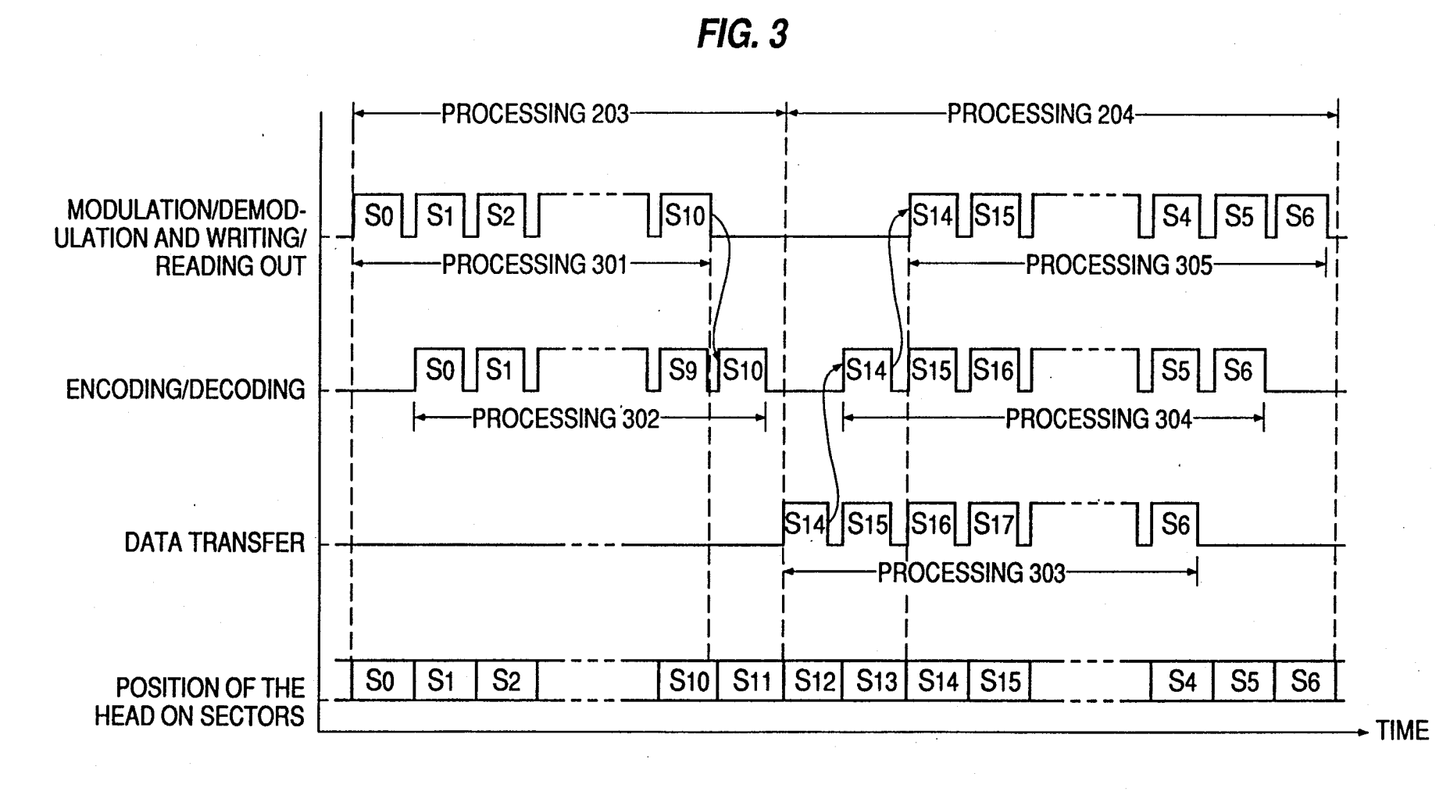
FIG. 3 is a time chart for illustrating the second embodiment of the present invention.

FIG. 3 is a detailed timing chart showing the sequence from the point of completion of the verifying operation to the point of the start of the data recording operation in the embodiment of the present invention.

Figure 4:
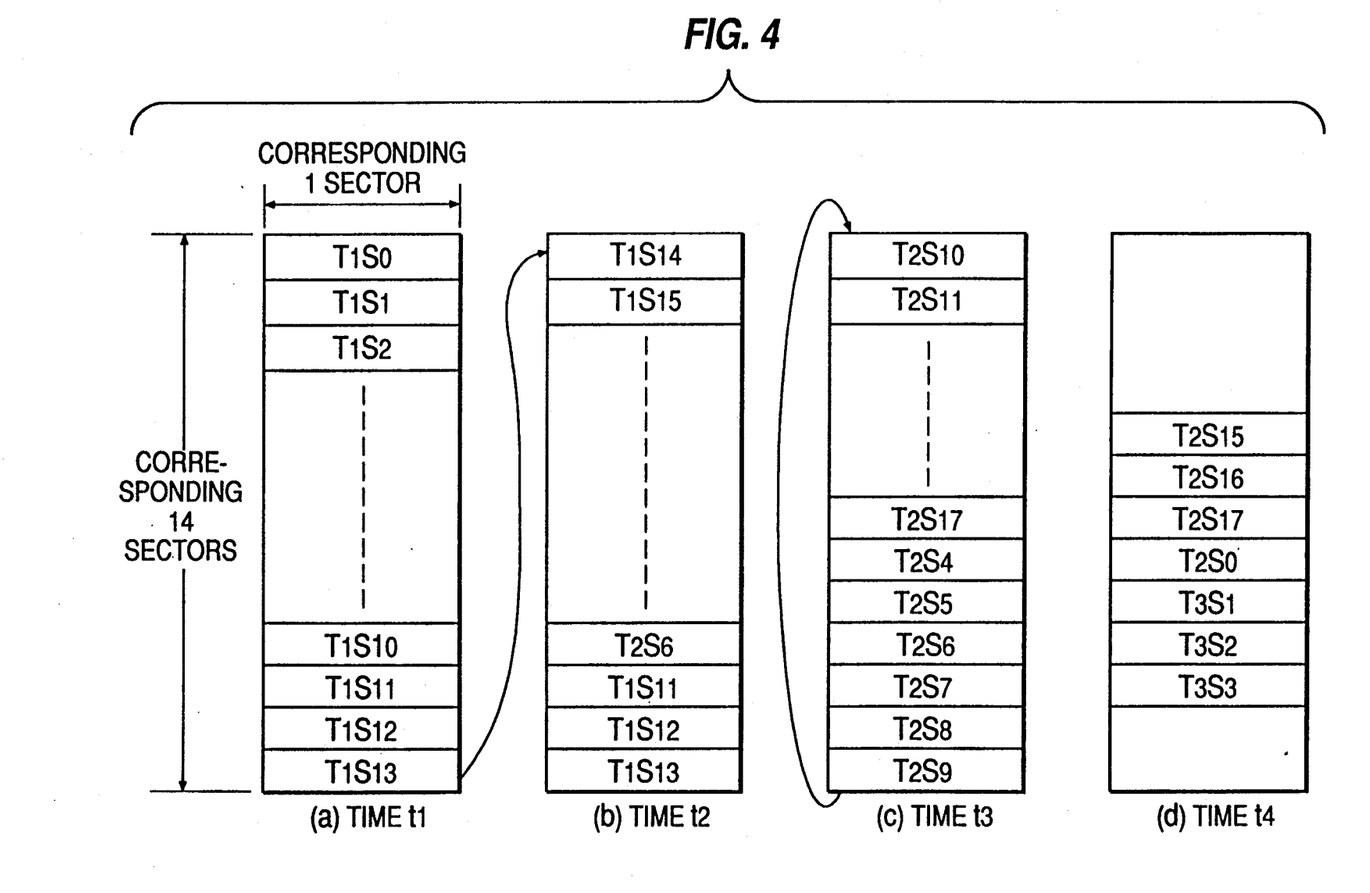

FIGS. 4(a)-(d) depict is a memory map showing the state in the memory circuit 53 in the embodiment of the present invention. FIGS. 4(a), (b), (c) and (d) show respectively the recorded data stored in the memory circuit 53 at the time $t_1$, $t_2$, $t_3$ and $t_4$ in FIG. 2.

In the present embodiment, the data recording operation of 40 sectors onto the optical disk in which one track is constituted by 18 sectors is explained below. The sector length is 1K bytes.

First, the data processing amount in each associated data recording operation and verifying operation is obtained as follows.

The time required for the jump operation between the tracks in the seek operation for searching the starting sector to carry out a verifying operation after the data recording operation is called a track jump time, which corresponds to the latency corresponding to 4 sectors. Further, the time required for the processing which is necessary for transition from the data recording operation to the verifying operation is called a write-verify overhead time. This write-verify overhead time is assumed to be equal to the track jump time.

Further, the time required for 1 sector decoding for the verifying operation, which is a post-process of the verifying operation, and the time required for 1 sector data transfer and 1 sector encoding, which are the preprocesses of the data recording operation, are integrally denoted the controller internal processing time, which corresponds to the latency corresponding to 3 sectors in total. Moreover, the time which is required for the processing from the time after completion of the data reading out operation in the verifying operation to the commencement of the data writing operation in the data recording operation is denoted a verify-write overhead time. This verify-write overhead time is to be equal to the controller internal processing time.

In the memory circuit 53, a memory corresponding to a 14 sector capacity is to be used for verifying operation.

The data processing unit in the first data recording operation is to be 14 sectors after subtracting 4 sectors corresponding to the track jump time from the sector capacity of 1 track, so as to commence the succeeding verifying operation without latency within the range not exceeding 14 sectors corresponding to the capacity of the memory circuit 53. Also, the data processing unit in the first verifying operation is to be 11 sectors after subtracting 3 sectors corresponding to the controller internal processing time from the processing unit of the data in the first data recording operation, so as to make the latency up to the data recording operation succeeding to the verifying operation a minimum.

The data processing unit in the second data recording operation is to be 11 sectors after subtracting the number of sectors corresponding to the track jump time and the controller internal processing time from the sector capacity of 1 track. The data processing unit in the second verifying operation is to be 11 sectors after subtracting the number of sectors corresponding to the controller internal processing time from the 14 sectors in which the verifying operation has not yet been completed. The data processing unit in the third data recording operation and the data processing unit in the third verifying operation are also 11 sectors in entirely the same manner as in the second operations.

Further, because the number of sectors in which the recording operation has not yet been completed is 4 sectors, which is less than the data processing amount in the second data recording operation, the data processing amount in the last data recording operation is to be the remaining 4 sectors. On completion of the recording operation for the last time, the verifying operation is performed on all of the 7 sectors on which the verifying operation has not yet been completed.

Next, the concrete processing procedures are explained in accordance with FIG. 2. Here again, it is assumed that, before the commencement of the first data recording operation, the information recording and reproducing head is positioned at the top of the sector in which the data is to be written, and the data recording and verifying are to be performed from the sector $S_0$ of the track $T_1$.

First, the data recording operation for 14 sectors from the sector $S_0$ of the track $T_1$ to the sector $S_{13}$ of the track $T_1$, i.e., the processing 201, is performed. Then, the seek operation to the top of the data to be verified, i.e., the processing 202 is performed. In the processing 202, the inter-track jump operation is completed within the track jump time corresponding to the latency corresponding to 4 sectors. Immediately thereafter, the unillustrated recording and reproducing head is at the top of the sector $S_0$ of the track $T_1$, by which the seek operation of the processing 202 is completed.

Next, in the processing 203, the verifying operation for the 11 sectors from the sector $S_0$ of the track $T_1$ to the sector $S_{10}$ of the track $T_1$ is performed. Further, in the processing 204, the second data recording operation is carried out for the data of the 11 sectors from the sector $S_{14}$ of track $T_1$. Thereafter, the operations of processing 205 or the latency for the seek operation, processing 206 or the data verifying operation for the 11 sectors, and processing 207 or the data recording operation for 11 sectors are performed. Further, processing 208 or the latency for the seek operation, processing 209 or the data verifying operation for the 11 sectors, processing 210 or the data recording operation for the remaining 4 sectors, processing 211 or the latency for seek operation, and finally processing 212 or the data verifying operation for 7 sectors are repeated in a similar manner to complete the data recording operation for 40 sectors.

Detailed operations of the processing 203 and the processing 204 are explained using FIG. 3. The first verifying operation of the processing 203 is performed from the sector $S_0$ of the track $T_1$. The verifying operation is constituted by the two parallel operations of the processing 301, or the data reading out and demodulation operation per 1 sector, and the processing 302, or the decoding operation of the read out data. The processing 204 or the second data recording operation is carried out from the sector $S_{14}$ of track $T_1$. This data recording operation is constituted by the processing 303 or the data transfer operation, the processing 304 or the encoding operation per 1 sector, and the processing 305 or the modulation and writing of the encoded data. The operations of processing 304 and processing 305 are carried out in parallel with each other.

After completion of the processing 301 or data reading out and demodulation operation, 1 sector decoding operation, data transfer operation prior to the data modulation and writing operation, and 1 sector encoding operation are carried out within the latency corresponding to 3 sectors. Then, the processing 305 or data modulation and writing operation is carried out. In order to eliminate the latency from the time after completion of the verifying operation to the commencement of the data recording operation, the optical disk drive controller 58 carries out a verifying operation up to the sector $S_{11}$ of the track $T_0$, with 3 sectors corresponding to the controller internal processing time left in advance by the track $T_1$ sector $S_{14}$ at which the operation of the processing 305 starts. In the processing 203, the data recording operation of 11 sectors is performed in this manner.

In this data recording operation, storing of the recorded data in the memory circuit 53 is carried out as follows: The recorded data is first stored from the top of the memory circuit 53, and then sequentially stored from the data next to the data previously stored. The memory circuit 53 is used in a so-called round buffer type manner, so that, when the data to be housed comes to the last order, it stores the data from the head of the memory again.

At the time $t_1$ after termination of the operation of the processing 201, as shown in FIG. 4(a), the data recorded in the processing 201 is stored from the top of the memory circuit 53. In the operation of the processing 204, at the time $t_2$ when the operation of the processing 204 is terminated, of the recorded data, the data of 14 sectors are not verified, and the state in the memory circuit 53 is as shown in FIG. 4(b). Even at the time $t_3$ when the processing 207 has been terminated, the data of 14 sectors which have not yet been verified are stored in the memory circuit 53 as in FIG. 4(c). At the time $t_4$ at which the processing 210 which is the last data recording operation is terminated, the non-verified data of 7 sectors are stored as in FIG. 4(d).

In the above manner, the data recording in the second embodiment can be performed within the memory capacity corresponding to 14 sectors after subtracting 4 sectors corresponding to the track jump time from the sector capacity of 1 track.

As described above, according to this embodiment, in repeating alternately the data recording operation and the verifying operation, the latency for the seek operation to the starting sector of the verifying operation after the data recording operation can be minimized, and information recording can be carried out in a small memory capacity.

Lastly, the data processing sector amount in the data recording operation and verifying operation which is a point of this system is explained in generalized form.

The data processing sector amount in the first data recording operation is set to be the value lying within the memory capacity and obtained by subtracting the number of the sectors corresponding to the track jump time between the tracks from the number of the sectors of the integer tracks, so as to minimize the latency for the seek operation. This value is called the recording sector unit amount. The data processing sector amount in the subsequent verifying operation is to be a value obtained after subtracting the number of sectors corresponding to the controller internal processing time from the recording sector unit amount so that the controller internal processing time is formed. This value is called a write-verify sector unit amount.

The data processing sector amount in the second and subsequent data recording operations is to be a value obtained after subtracting the number of sectors corresponding to the track jump time and the controller internal processing time from the number of sectors corresponding to the same track number as that at the time of determining the initial recording sector number. This value becomes the same as the write-verify sector unit amount. The data processing unit in the second and subsequent verifying operation is to be a value obtained after subtracting the number of sectors corresponding to the controller internal processing time from the number of sectors which have not yet completed the verifying operation at the time of the commencement of the verifying operation. This value also becomes the same as the write-verify sector unit amount.

In the second and subsequent data recording operations, when the remaining number of sectors to be recorded becomes equal or less than the number of the write-verify sectors, the remaining number of sectors to be recorded at that time is to be taken as the data processing sector unit amount in the final data recording operation. Also, the number of the sectors not verified at the termination of the data recording operation is to be taken as the data processing unit in the final verifying operation.

In the present embodiment, the track jump time is taken as the time required for the inter-track jump operation in the seek operation for searching the starting sector which is carried out the verifying operation after the data recording operation. However, the present invention can be similarly applied by replacing this with the processing time of the operation necessitated during the time from after the data recording operation to the verifying operation. Further, in this embodiment the controller internal processing time is set to be the total of the time required for the pre-process of the verifying operation and the post-processes of the data recording operation. However, even by replacing this with the time required for the necessary processing from after the verifying operation to the next data recording operation, the present invention can be similarly applied.

Further, in the present invention the invention is described only on the case where the information recording medium is an optical disk. However, the information recording and reproducing system of the present invention can be applied in entirely the same manner to the case of carrying out the data recording operation and the verifying operation alternately in repetition with an information recording medium having a spiral track structure other than optical disk.

What is claimed is:

1. An information recording method for recording information on a recording medium having a spiral track structure which is divided into a plurality of sectors, said method comprising:
   a first step of conducting a data write operation for recording data on N sectors along said spiral track structure of said recording medium, N being a positive integer;
   a second step of conducting a data verifying operation for verifying the correctness of said data previously recorded on said N sectors along said spiral track structure in said first step;
   where N is obtained by subtracting a number of sectors across which a recording head is conveyed relative said recording medium during a time period required for changing from said data write operation to said data verifying operation from a number, or a multiple of a number, of sectors contained in one track;
   a third step of repeated and sequentially carrying out said first and second steps until a completion of said recording of information on said recording medium.

2. An information recording method as recited in claim 1, wherein said time period corresponds to a time elapsed during an inter-track jump operation in which the recording head is conveyed from a final recorded sector of said data write operation to a starting sector of said data verifying operation.

3. An information recording method for recording information on a recording medium having a spiral track structure which is divided into a plurality of sectors, said method comprising;
   a first step of conducting a first data write operation for recording data on N sectors along said spiral track structure on said recording medium, N being a positive integer;
   a second step of conducting a first data verifying operation for verifying the correctness of said data previously recorded on M of said N sectors along said spiral track structure in said first step, M being a positive integer which is less than N;
   where N is obtained by subtracting a number of sectors across which a recording head is conveyed relative said recording medium during a first time period required for changing from said first data write operation to said first data verifying operation from a number, or a multiple of a number, of sectors contained in one track;
   a third step of conducting a second data write operation for recording data on M sectors along said spiral track structure of said recording medium;
   a fourth step of conducting a second verifying operation for verifying the correctness of said data previously recorded on M sectors along said spiral track structure;
   where M is obtained by subtracting from N a number of sectors across which the recording head is conveyed relative the recording medium during a second time period required for changing from said second data write operation to said second data verifying operation;
   a fifth step of repeatedly and sequentially carrying out said third and fourth steps until a completion of said recording of information on said recording medium.

4. An information recording method as recited in claim 3, wherein said second time period corresponds to a time elapsed during an inter-track jump operation in which the recording head is conveyed from a final recorded sector of said second data write operation to a starting sector of said second data verifying operation.

5. An information recording method as recited in claim 3, wherein said second time period corresponds to a sum of a time required in said data verifying operation for decoding error correcting codes in one sector and a time required in said data write operation for transferring data in one sector and encoding error correcting codes in one sector.

* * * * *